US00RE35698E

United States Patent [19]

Behe et al.

[11] E Patent Number: Re. 35,698

[45] Reissued Date of Patent: Dec. 23, 1997

[54] DONOR ROLL FOR SCAVENGELESS DEVELOPMENT IN A XEROGRAPHIC APPARATUS

[75] Inventors: Thomas J. Behe, Webster; Jeffrey J. Folkins; Gerald T. Lioy, both of Rochester; Grace T. Brewington, Fairport; Joseph G. Schram, Liverpool; William H. Wayman, Ontario, all of N.Y.

[73] Assignee: Xerox Corporation, Stamford, Conn.

[21] Appl. No.: 527,987

[22] Filed: Sep. 14, 1995

Related U.S. Patent Documents

Reissue of:

[64] Patent No.: 5,245,392
Issued: Sep. 14, 1993
Appl. No.: 955,965
Filed: Oct. 2, 1992

[51] Int. Cl.[6] ..... G03G 15/06

[52] U.S. Cl. ..... 399/286; 399/285

[58] Field of Search ..... 355/245, 259, 355/247, 249, 261–263, 265, 215; 118/653, 647–651, 654, 661; 399/286, 285

[56] References Cited

U.S. PATENT DOCUMENTS

| | | |
|---|---|---|
| 3,521,126 | 7/1970 | Granzow et al. . |
| 3,625,146 | 12/1971 | Hutchinson . |
| 3,697,836 | 10/1972 | Moss et al. . |
| 3,778,690 | 12/1973 | Rothacker et al. . |
| 3,950,089 | 4/1976 | Fraser et al. . |
| 4,009,658 | 3/1977 | Heurich . |
| 4,034,709 | 7/1977 | Fraser et al. . |
| 4,060,882 | 12/1977 | Pospisil et al. . |
| 4,069,570 | 1/1978 | Pospisil et al. . |
| 4,395,109 | 7/1983 | Nakajima et al. . |
| 4,578,831 | 4/1986 | Ikeda et al. . |
| 4,618,240 | 10/1986 | Sakurai et al. . |

(List continued on next page.)

FOREIGN PATENT DOCUMENTS

| | | |
|---|---|---|
| 0-458-603-B1 | 11/1991 | European Pat. Off. . |
| 56-22459 | 3/1981 | Japan . |
| 56-123581 | 9/1981 | Japan . |

(List continued on next page.)

OTHER PUBLICATIONS

Translation of Japanese Patent Application Laid–Open No. 4–255878; Laid Open Date: Sep. 10, 1992; pp. 4–5 and one page of drawings, Figs. 1 and 3–7.

Translation of Japanese Patent Application Laid–Open No. 4–243279; Laid Open Date: Aug. 31, 1992; pp. 6–12 and two pages of drawings, Figs. 1–7.

"A Design of Experiment Study of Plasma Sprayed Alumina–Titania Coatings", T. J. Steeper et al., Proceedings of the International Thermal Spray Conference & Exposition, Orlando, Florida, USA, 28 May–5, Jun., 1992,pp. 415–420.

"A Taguchi Experimental Design Study of Plasma Sprayed Alumina–Titania Coatings", T. J. Steeper et al., Proceedings of the Fourth National Thermal Spray Conference, Pittsburgh, PA, USA 4–10 May 1991, pp. 13–20.

"A Taguchi Design of Experiment Study of Plasma Sprayed Alumina Coatings", T. J. Steeper et al., Proceedings of the 1993 National Thermal Spray Conference, Anaheim, CA 7–11 Jun., 1993, pp. 31–36.

"Plasma Spray Coating Parameter Development", J. Walter et al., Thermal Spray Research and Applications, Proceedings of the Third National Thermal Spray Conference, Long Beach, CA, USA, 20–25 May, 1990, pp. 729–742.

*Primary Examiner*—Matthew S. Smith
*Attorney, Agent, or Firm*—Oliff & Berridge

[57] ABSTRACT

A donor roll for the conveyance of toner in a development system for an electrophotographic printer includes an outer surface of phenolic resin. The resin is doped to a suitable conductivity to facilitate a discharge time constant thereon of less than 300 microseconds. The donor roll is used in conjunction with an electrode structure as used in scavengeless development.

44 Claims, 3 Drawing Sheets

U.S. PATENT DOCUMENTS

| | | | |
|---|---|---|---|
| 4,628,183 | 12/1986 | Satomura . | |
| 4,716,134 | 12/1987 | Yamaguchi et al. . | |
| 4,743,940 | 5/1988 | Nagasaka et al. . | |
| 4,774,541 | 9/1988 | Martin et al. . | |
| 4,791,275 | 12/1988 | Lee et al. . | |
| 4,793,041 | 12/1988 | Jenkins et al. . | |
| 4,794,680 | 1/1989 | Meyerhoff et al. . | |
| 4,810,858 | 3/1989 | Urban et al. . | |
| 4,813,372 | 3/1989 | Kogure et al. . | |
| 4,820,904 | 4/1989 | Urban . | |
| 4,827,305 | 5/1989 | Enoguchi et al. . | |
| 4,830,996 | 5/1989 | Hirai et al. . | |
| 4,841,154 | 6/1989 | Yoshikawa et al. . | |
| 4,868,600 | 9/1989 | Hays et al. . | |
| 4,893,151 | 1/1990 | Yamazaki et al. . | |
| 4,895,629 | 1/1990 | Castegnier et al. . | |
| 4,897,374 | 1/1990 | Matsumoto et al. . | |
| 4,912,824 | 4/1990 | Baran . | |
| 4,963,404 | 10/1990 | Jenkins . | |
| 4,972,230 | 11/1990 | Wayman . | |
| 4,974,028 | 11/1990 | Enoguchi et al. . | |
| 4,984,019 | 1/1991 | Folkins . | |
| 4,989,044 | 1/1991 | Nishimura et al. . | |
| 4,990,963 | 2/1991 | Yamamoto et al. . | |
| 5,010,367 | 4/1991 | Hays . | |
| 5,010,368 | 4/1991 | O'Brien . | |
| 5,034,775 | 7/1991 | Folkins . | |
| 5,054,419 | 10/1991 | Itaya et al. . | |
| 5,063,875 | 11/1991 | Folkins et al. . | |
| 5,077,578 | 12/1991 | Grammatica et al. . | |
| 5,089,856 | 2/1992 | Landa et al. . | |
| 5,093,180 | 3/1992 | Morgan . | |
| 5,099,285 | 3/1992 | Hirano et al. . | |
| 5,128,723 | 7/1992 | Bolte et al. . | |
| 5,132,735 | 7/1992 | Howland . | |
| 5,144,370 | 9/1992 | Bares . | |
| 5,144,371 | 9/1992 | Hays . | |
| 5,153,647 | 10/1992 | Barker et al. . | |
| 5,153,648 | 10/1992 | Lioy et al. . | |
| 5,177,538 | 1/1993 | Mammino et al. . | |
| 5,219,809 | 6/1993 | Kato et al. . | |
| 5,236,763 | 8/1993 | Luthi . | |
| 5,253,016 | 10/1993 | Behe et al. | 399/259 X |
| 5,257,966 | 11/1993 | Watanabe et al. . | |
| 5,300,339 | 4/1994 | Hays et al. | 355/259 X |
| 5,322,970 | 6/1994 | Behe et al. | 355/259 X |
| 5,408,070 | 4/1995 | Hyllberg . | |
| 5,420,395 | 5/1995 | Hyllberg et al. . | |
| 5,448,342 | 9/1995 | Hays et al. | 355/259 |
| 5,473,418 | 12/1995 | Kazakos et al. | 355/259 |
| 5,600,414 | 2/1997 | Hyllberg . | |

FOREIGN PATENT DOCUMENTS

| | | |
|---|---|---|
| 57-118278 | 7/1982 | Japan . |
| 58-16273 | 1/1983 | Japan . |
| 58-220165 | 12/1983 | Japan . |
| 59-7384 | 1/1984 | Japan . |
| 59-51364 | 3/1984 | Japan . |
| 60-17461 | 1/1985 | Japan . |
| 60-17462 | 1/1985 | Japan . |
| 60-17463 | 1/1985 | Japan . |
| 60-17770 | 1/1985 | Japan . |
| 61-13270 | 1/1986 | Japan . |
| 61-140967 | 6/1986 | Japan . |
| 61-148478 | 7/1986 | Japan . |
| 61-194463 | 8/1986 | Japan . |
| 61-254969 | 11/1986 | Japan . |
| 61-284584 | 12/1986 | Japan . |
| 62-47673 | 3/1987 | Japan . |
| 62-247386 | 10/1987 | Japan . |
| 63-92369 | 6/1988 | Japan . |
| 63-307489 | 12/1988 | Japan . |
| 64-34656 | 3/1989 | Japan . |
| 1-102485 | 4/1989 | Japan . |
| 1-138577 | 5/1989 | Japan . |
| 1-142574 | 6/1989 | Japan . |
| 1-142575 | 6/1989 | Japan . |
| 1-142576 | 6/1989 | Japan . |
| 1-142748 | 6/1989 | Japan . |
| 1-142749 | 6/1989 | Japan . |
| 1-142750 | 6/1989 | Japan . |
| 1-142751 | 6/1989 | Japan . |
| 1-142752 | 6/1989 | Japan . |
| 1-142753 | 6/1989 | Japan . |
| 1-142754 | 6/1989 | Japan . |
| 1-142755 | 6/1989 | Japan . |
| 1-142756 | 6/1989 | Japan . |
| 1-144077 | 6/1989 | Japan . |
| 1-144078 | 6/1989 | Japan . |
| 1-255873 | 10/1989 | Japan . |
| 1-257881 | 10/1989 | Japan . |
| 4-162060 | 6/1992 | Japan . |
| 4-220667 | 8/1992 | Japan . |
| 4-240676 | 8/1992 | Japan . |

DONOR ROLL FOR SCAVENGELESS DEVELOPMENT IN A XEROGRAPHIC APPARATUS

Matter enclosed in heavy brackets [ ] appears in the original patent but forms no part of this reissue specification; matter printed in italics indicates the additions made by reissue.

The present invention relates to developer apparatus for electrophotographic printing. More specifically, the invention relates to a donor roll as part of a scavengeless development process.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

In the process of electrophotographic printing, the step of conveying toner to the latent image on the photoreceptor is known as "development." The object of effective development of a latent image on the photoreceptor is to convey toner particles to the latent image at a controlled rate so that the toner particles effectively adhere electrostatically to the charged areas on the latent image. A commonly used technique for development is the use of a two-component developer material, which comprises, in addition to the toner particles which are intended to adhere to the photoreceptor, a quantity of magnetic carrier beads. The toner particles adhere triboelectrically to the relatively large carrier beads, which are typically made of steel. When the developer material is placed in a magnetic field, the carrier beads with the toner particles thereon form what is known as a magnetic brush, wherein the carrier beads form relatively long chains which resemble the fibers of a brush. This magnetic brush is typically created by means of a "developer roll." The developer roll is typically in the form of a cylindrical sleeve rotating around a fixed assembly of permanent magnets. The carrier beads form chains extending from the surface of the developer roll, and the toner particles are electrostatically attracted to the chains of carrier beads. When the magnetic brush is introduced into a development zone adjacent the electrostatic latent image on a photoreceptor, the electrostatic charge on the photoreceptor will cause the toner particles to be pulled off the carrier beads and onto the photoreceptor. Another known development technique involves a single-component developer, that is, a developer which consists entirely of toner. In a common type of single-component system, each toner particle has both an electrostatic charge (to enable the particles to adhere to the photoreceptor) and magnetic properties (to allow the particles to be magnetically conveyed to the photoreceptor). Instead of using magnetic carrier beads to form a magnetic brush, the magnetized toner particles are caused to adhere directly to a developer roll. In the development zone adjacent the electrostatic latent image on a photoreceptor, the electrostatic charge on the photoreceptor will cause the toner particles to be pulled off the developer roll and onto the photoreceptor.

An important variation to the general principle of development is the concept of "scavengeless" development. The purpose and function of scavengeless development are described more fully in, for example, U.S. Pat. No. 4,868,600 to Hays et al., U.S. Pat. No. 4,984,019 to Folkins, U.S. Pat. No. 5,010,367 to Hays, or U.S. Pat No. 5,063,875 to Folkins et al. In a scavengeless development system, toner is conveyed to the photoreceptor by means of AC electric fields supplied by self-spaced electrode structures, commonly in the form of wires extending across the photoreceptor, positioned within the nip between a donor roll and photoreceptor. Because there is no physical contact between the development apparatus and the photoreceptor, scavengeless development is useful for devices in which different types of toner are supplied onto the same photoreceptor, as in "tri-level" or "recharge, expose, and develop" highlight or image-on-image color xerography.

A typical "hybrid" scavengeless development apparatus includes, within a developer housing, a transport roll, a donor roll, and an electrode structure. The transport roll operates in a manner similar to a developer roll, but instead of conveying toner directly to the photoreceptor, conveys toner to a donor roll disposed between the transport roll and the photoreceptor. The transport roll is electrically biased relative to the donor roll, so that the toner particles are attracted from the transport roll to the donor roll. The donor roll further conveys toner particles from the transport roll toward the photoreceptor. In the nip between the donor roll and the photoreceptor are the wires forming the electrode structure. During development of the latent image on the photoreceptor, the electrode wires are AC-biased relative to the donor roll to detach toner therefrom so as to form a toner powder cloud in the gap between the donor roll and the photoreceptor. The latent image on the photoreceptor attracts toner particles from the powder cloud, forming a toner powder image thereon.

Another variation on scavengeless development is single-component scavengeless development, also known as scavengeless SCD. In scavengeless SCD, the donor roll and the electrode structure create a toner powder cloud in the same manner as the above-described scavengeless development, but instead of using a magnetic brush to convey toner particles from the toner supply in the developer housing to the donor roll, a portion of the donor roll is exposed directly to a supply of single-component developer, which is pure toner. Scavengeless SCD provides the same advantages as the basic case of hydrid scavengeless development, and is useful in situations where the size, weight, or power consumption of the apparatus is of particular concern.

In any type of scavengeless development apparatus, one of the most important elements is the donor roll which conveys toner particles to the wires forming the electrode structure in the nip between the donor roll and the photoreceptor. Broadly speaking, a donor roll can be defined as any roll in which pure toner particles are intended to adhere to the surface thereof. In order to function in a commercially-practical embodiment of scavengeless development, a donor roll must meet certain requirements.

In general, a donor roll should include a conductive core and define a partially conductive surface, so that the toner particles may adhere electrostatically to the surface in a reasonably controllable fashion. In hybrid scavengeless development, the donor roll provides an electrostatic "intermediate" between the photoreceptor and the transport roll. The provision of this intermediate and the scavengeless nip is to prevent unwanted interactions between the development system and the photoreceptor, in particular with a pre-developed latent image already on the photoreceptor before the latent image in question is developed. This lack of interaction makes scavengeless development preferably in situations where a single photoreceptor is developed numerous times in a single process, such as in color or in highlight-color xerography.

The donor roll must further have desirable wear properties so the surface thereof will not be abraded by adjacent surfaces within the apparatus, such as the magnetic brush of a transport roll. Further, the surface of the donor roll should be without anomalies such as pin holes, which may be created in the course of the manufacturing process for the donor roll. The reason that this such small surface imperfections must be avoided is that any such imperfections, whether pinholes created in the manufacturing process or abrasions made in the course of use, is that such imperfections can result in electrostatic "hot spots" caused by arcing in the vicinity of such structural imperfections. Ultimately, the most important requirement of the donor roll can be summarized by the phase "uniform conductivity;" the surface of the donor roll must be partially conductive relative to a more conductive core, and this partial conductivity on the surface should be uniform through the entire surface area. Other physical properties of the donor roll, such as the mechanical adhesion of toner particles, are also important, but are generally not as quantifiable in designing development apparatus. In addition, the range of conductivity for the service of a donor roll should be well chosen to maximize the efficiency of a donor roll in view of any number of designed parameters, such as energy consumption, mechanical control and the discharge time-constant of the surface.

U.S. Pat. No. 3,950,089 discloses a development apparatus in which a surface for the direct conveyance of electrically-conductive toner comprises a dielectric sheath of a thickness of 1–25 mils, having a resistivity of $10^7$ to $10^9$ ohm-cm.

U.S. Pat. No. 4,034,709 discloses a development apparatus in which a surface for the direct conveyance of toner comprises styrene-butadiene, of a resistivity of $10^2$ to $10^6$ ohm-cm.

U.S. Pat. No. 4,774,541 discloses a development apparatus in which a surface for the direct conveyance of toner is doped with carbon black to a conductivity of $10^{-6}$ to $10^{-10}$ 1/ohm-cm.

In the prior art, there are numerous instances in which the physical properties of phenolic resin are exploited for various purposes relating to development of electrostatic latent images. U.S. Pat. No. 4,827,305 discloses a development apparatus in which a transport roll includes restricting rollers mounted on the ends thereon which are made of phenolic resin.

U.S. Pat. No. 4,989,044 discloses another single-component developer system in which the sleeve of a transport roll has an outer coating layer made of a resin material, such as phenolic resin, in which electrically conductive fine particles are disbursed.

U.S. Pat. No. 4,990,963 discloses a transport roll made of a resin solution of 17% phenol resin.

U.S. Pat. No. 5,054,419 discloses a developing apparatus wherein a cylindrical bar is used to meter the amount of toner on the surface of a transport roll. In one embodiment, the cylindrical bar is made of phenolic resin.

U.S. Pat. No. 5,099,285 discloses experiments with a transport roll for single-component development in which the outer layer is in one embodiment made of phenolic plastic.

According to the present invention, there is provided an apparatus for developing an electrostatic latent image. A housing defines a chamber for storing a supply of developer material therein. A donor roll, having an outer surface comprising phenolic resin, is mounted at least partially in the chamber of said housing, to advance developer material to the latent image. An electrode member is positioned in the space between the latent image and the donor roll, closely spaced from the donor roll and electrically biased to detach toner particles from the donor roll so as to form a toner powder cloud in the space between the electrode member and the latent image with detached toner particles from the toner cloud developing the latent image.

According to one preferred embodiment of the present invention, the phenolic resin comprising the outer surface of the donor roll has a discharge time constant of less than 300 microseconds. Further, the surface is doped to conductivity of greater than $10^{-8}$ (ohm cm)$^{-1}$.

According to another aspect of the present invention, there is provided a donor roll having a non-metallic outer layer wherein the thickness of the outer layer divided by the dielectric constant thereof is less than certain other parameters of the development system.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 3 printing machine will be shown hereinafter schematically and their operation described briefly with reference thereto.

Figure 3:
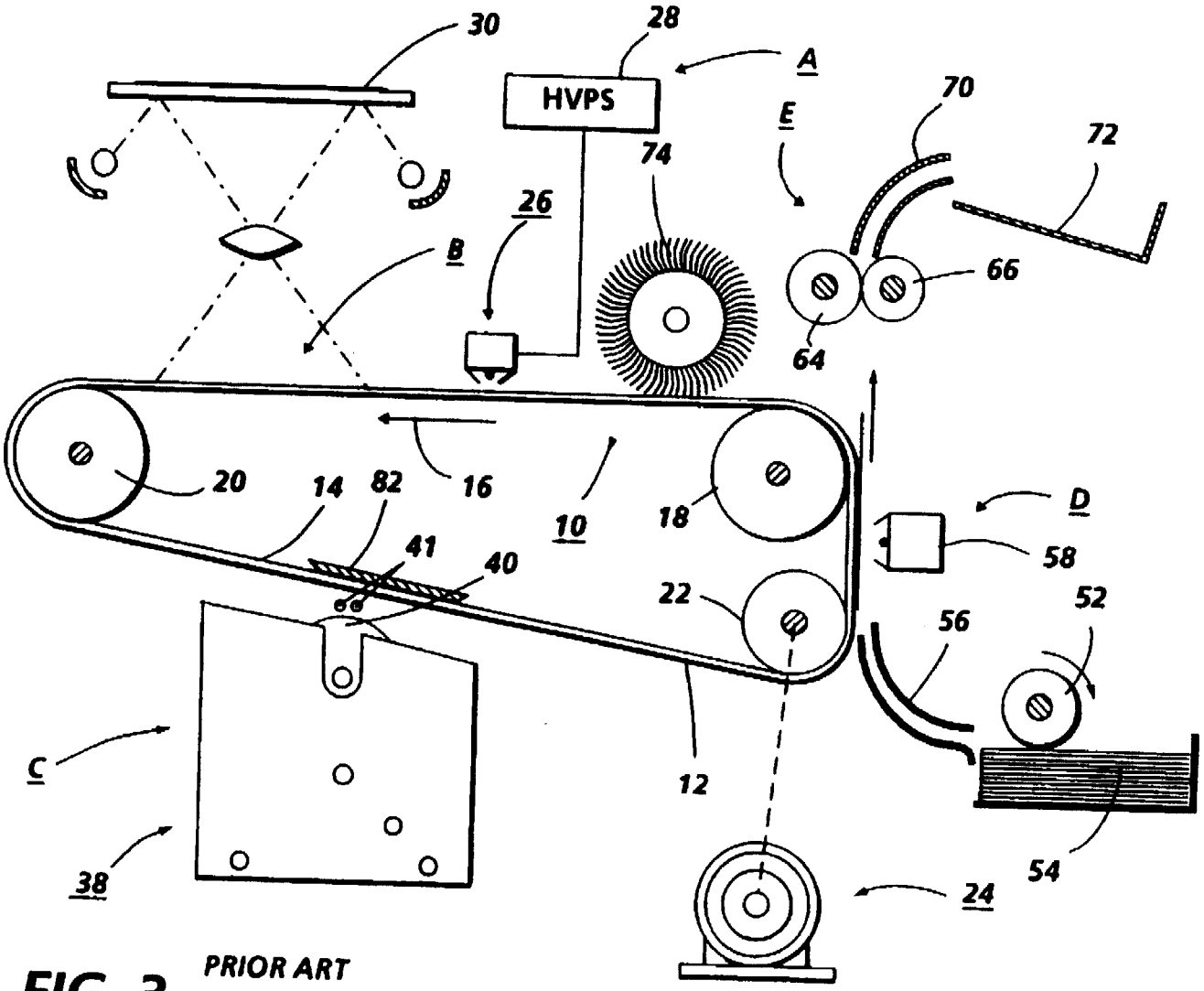
FIG. 3 PRIOR ART
FIG. 3 is a simplified elevational view of an electrophotographic printing apparatus in which the present invention may be embodied.

Referring initially to FIG. 3, there is shown an illustrative electrophotographic printing machine incorporating the development apparatus of the present invention therein. The printing machine incorporates a photoreceptor 10 in the form of a belt having a photoconductive surface layer 12 on an electroconductive substrate 14. Preferably the surface 12 is made from a selenium alloy. The substrate 14 is preferably made from an aluminum alloy which is electrically grounded. The belt is driven by means of motor 24 along a path defined by rollers 18, 20 and 22, the direction of movement being counter-clockwise as viewed and as shown by arrow 16. Initially a portion of the belt 10 passes through a charge station A at which a corona generator 26 charges surface 12 to a relatively high, substantially uniform, potential. A high voltage power supply 28 is coupled to device 26. After charging, the charged area of surface 12 is passed to exposure station B.

At exposure station B, an original document 30 is placed face down upon a transparent platen 32. Lamps 34 flash light rays onto original document 30. The light rays reflected from original document 30 are transmitted through lens 36 to form a light image thereof. Lens 36 focuses this light image onto the charged portion of photoconductive surface 12 to selectively dissipate the charge thereon. This records an electrostatic latent image on photoconductive surface 12 which corresponds to the informational areas contained within original document 30.

After the electrostatic latent image has been recorded on photoconductive surface 12, belt 10 advances the latent image to development station C. At development station C, a development system, develops the latent image recorded on the photoconductive surface. Preferably, development system includes a donor roller 40 and electrode wires positioned in the gap between the donor roll and photoconductive belt. Electrode wires 41 are electrically biased relative to donor roll 40 to detach toner therefrom so as to form a toner powder cloud in the gap between the donor roll and photoconductive surface. The latent image attracts toner particles from the toner powder cloud forming a toner powder image thereon. Donor roll 40 is mounted, at least partially, in the chamber of developer housing 38. The chamber in developer housing 38 stores a supply of developer material. The developer material is a two component developer material of at least magnetic carrier granules having toner particles adhering triboelectrically thereto. A transport roller disposed interiorly of the chamber of housing 38 conveys the developer material to the donor roller. The transport roller is electrically biased relative to the donor roller so that the toner particles are attracted from the transport roller to the donor roller. The development apparatus will be discussed hereinafter, in grater detail, with reference to FIG. 1.

After the electrostatic latent image has been developed, belt 10 advances the developed image to transfer station D, at which a copy sheet 54 is advanced by roll 52 and guides 56 into contact with the developed image on belt 10. A corona generator 58 is used to spray ions on to the back of the sheet so as to attract the toner image from belt 10 the sheet. As the belt turns a round roller 18, the sheet is stripped therefrom with the toner image thereon.

After transfer, the sheet is advanced by a conveyor (not shown) to fusing station E. Fusing station E includes a heated fuser roller 64 and a back-up roller 66. The sheet passes between fuser roller 64 and back-up roller 66 with the toner powder image contacting fuser roller 64. In this way, the toner powder image is permanently affixed to the sheet. After fusing, the sheet advances through chute 70 to catch tray 72 for subsequent removal from the printing machine by the operator.

After the sheet is separated from photoconductive surface 12 of belt 10, the residual toner particles adhering to photoconductive surface 12 are removed therefrom by a rotatably mounted fibrous brush 74 in contact with photoconductive surface 12. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the development apparatus of the present invention therein.

Figure 1:
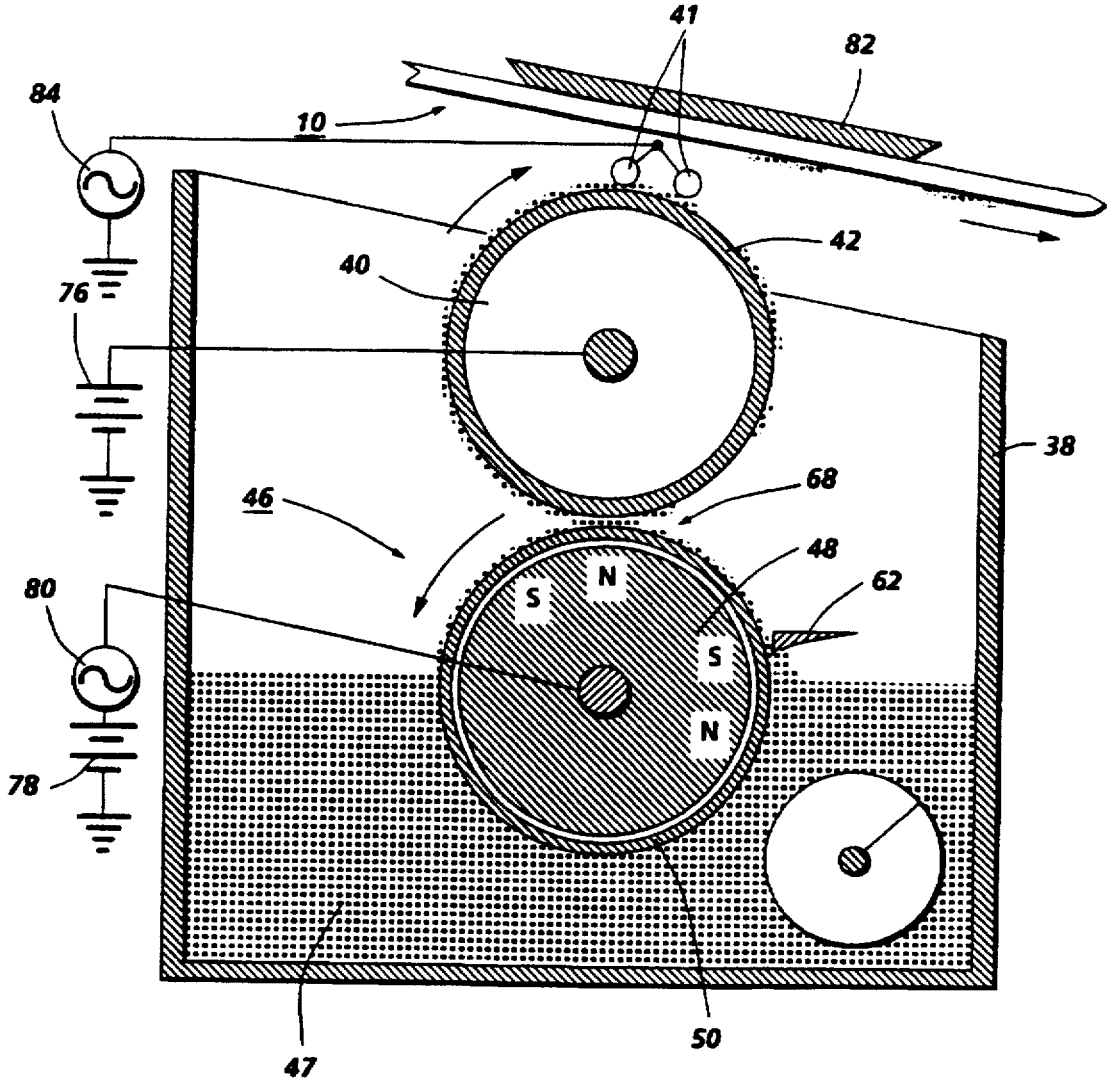
FIG. 1 is a simplified elevational view of a hybrid scavengeless development station, incorporating a donor roll according to the present invention.

Referring now to FIG. 1, there is shown development system 38 in grater detail. Housing 38 defines a chamber for storing a supply of developer material 47 therein. Positioned in the bottom of housing 38 is a horizontal auger which distributes developer material uniformly along the length of transport roll 46, so that the lowermost part of roll 46 is always immersed in a body of developer material.

Transport roll 46 comprises a stationary multi-polar magnet 48 having a closely spaced sleeve 50 of non-magnetic material, preferably aluminum, designed to be rotated about the magnetic core 48 in a direction indicated by the arrow. Because the developer material includes magnetic carrier granules, the effect of the sleeve rotating through stationary magnetic fields is to cause developer material to be attracted to the exterior of the sleeve. A doctor blade 62 is used to limit the radial depth of developer remaining adherent to sleeve 50 as it rotates to the nip 68 between transport roll 46 and donor roll 40. The donor roll is kept at a specific voltage, by a DC power supply 76, to attract a thin layer of toner particles transport roll 46 in nip 68 to the surface of donor roll 40. Either the whole of the donor roll 40, or at least a peripheral layer thereof, is preferably of material which has low electrical conductivity, as will be explained in detail below. The material must be conductive enough to prevent any build-up of electric charge with time, and yet its conductivity must be low enough to form a blocking layer to prevent shorting or arcing of the magnetic brush to the donor roll.

Transport roll 46 is biased by both a DC voltage source 78 and an AC voltage source 80. The effect of the DC electrical field is to enhance the attraction of developer material to sleeve 50. It is believed that the effect of the AC electrical field applied along the transport roll in nip 68 is to loosen the toner particles from their adhesive and triboelectric bonds to the carrier particles. AC voltage source 80 can be applied either to the transport roll as shown in FIG. 1, or directly to the donor roll in series with supply 76.

It has been found that a value of up to 200 $V_{rms}$ is sufficient for the output of source 80 for the desired level of reload efficiency of toner particles to be achieved. The actual value can be adjusted empirically: in theory it could be any value up to a voltage of about 400 $V_{rms}$. The source should be at a frequency of about 2 kHz. If the frequency is too low, e.g. less than 200 Hz, banding will appear on the copies. If the frequency is too high, e.g. more than 15 kHz, the system would probably work but the electronics may become expensive because of capacitive loading losses.

Electrode wires 41 are disposed in the space between the belt 10 and donor roller 40. A pair of electrode wires are shown extending in a direction substantially parallel to the longitudinal axis of the donor roll 40. The electrode wires are made from of one or more thin (i.e. 50 to 100 μm diameter) steel wires which are closely spaced from donor roller 40. The distance between the wires and the donor roll 40 is approximately 25 μm or the thickness of the toner layer formed on the donor roll 40. The wires are self-spaced from the donor roller by the thickness of the toner on the donor roller. To this end the extremities of the wires supported by the tops of end bearing blocks also support the donor roller for rotation. The wire extremities are attached so that they are slightly below a tangent to the surface, including toner layer, of the donor structure. Mounting the wires in such a manner makes them insensitive to roll runout due to their self-spacing. An alternating electrical bias is applied to the electrode wires by an AC voltage source 84. The applied AC establishes an alternating electrostatic field between the wires and the donor roller which is effective in detaching toner from the surface of the donor roller and forming a toner cloud about the wires, the height of the cloud being such as not to be substantially in contact with the belt 10.

At the region where the photoconductive belt 10 passes closest to donor roll 40, a stationary shoe 82 bears on the inner surface of the belt. The position of the shoe relative to the donor roll establishes the spacing between the donor roll and the belt. The position of the shoe is adjustable and it is positioned so that the spacing between the donor roll and photoconductive belt is preferably about 0.4 mm.

Another factor which has been found to be of importance is the speed with which the sleeve 50 is rotated relative to the speed of rotation of donor roll 40. In practice both would be driven by the same motor, but a gear train would be included in the drive system so that sleeve 50 is driven at a significantly faster surface velocity than is donor roll 40. A transport roll:donor roll speed ratio of 3:1 has been found to be particularly advantageous, and even higher relative speeds might be used in some embodiments of the invention. In other embodiments the speed ratio may be as low as 2:1.

Figure 2:
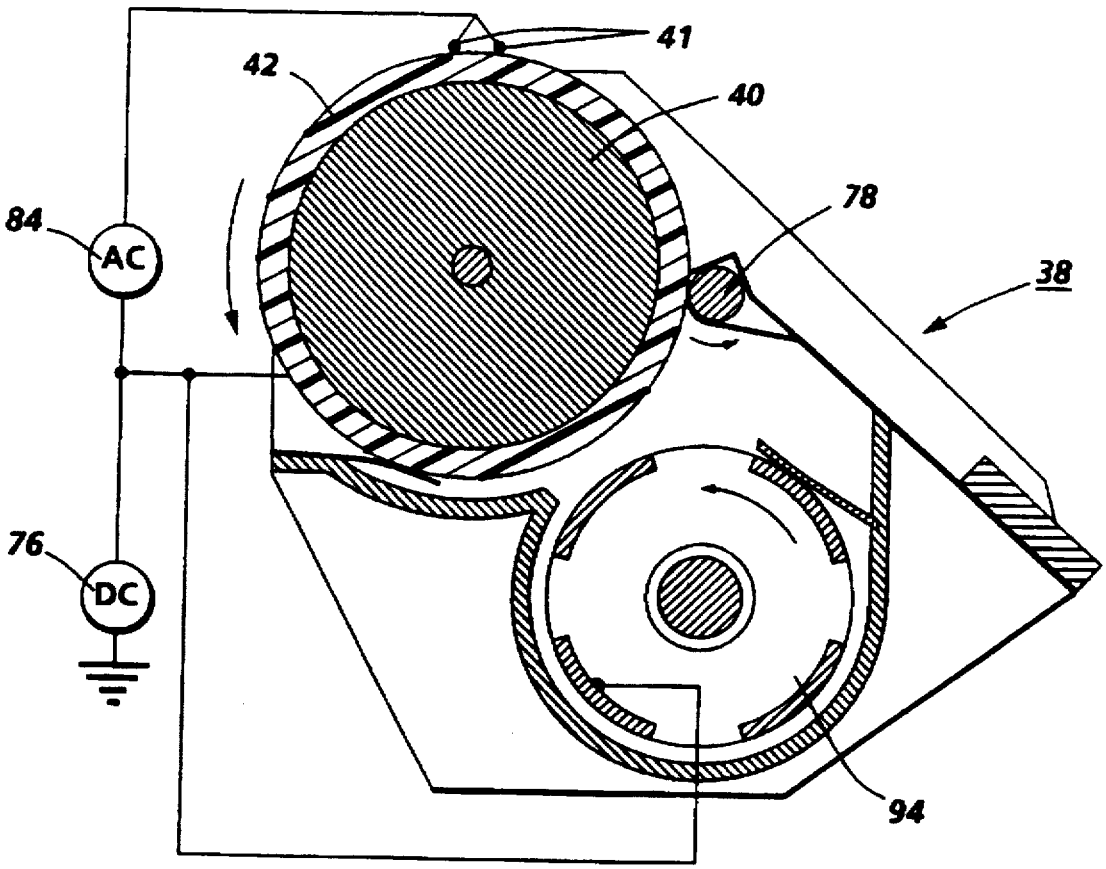
FIG. 2 is a simplified elevational view of a single component scavengeless development station, incorporating a donor roll according to the present invention.

FIG. 2 is a simplified plan view of a single-component scavengeless development station. The specific design of the single-component station in FIG. 2 is generally disclosed in U.S. Pat. No. 5,128,723, assigned to the assignee of the present application. In FIGS. 1 and 2, like reference numerals indicate like elements. As in the hybrid system of FIG. 1, the single-component system includes a donor roll 40 and electrode wires 41, but the donor roll 40 picks up toner to convey to the photoreceptor 10 directly from a supply of pure toner in the housing 38. In the single-component system of FIG. 2, there is no transport roll 46 and therefore no carrier beads are used in the developer. The specific design of the developer station in FIG. 2 may include special items useful in single-component developing, such as a charging rod 78 or electrically biased toner mover 94, the precise function of which is described in the above-reference patent.

According to the present invention, and referring to either FIGS. 1 or 2, the outer surface 42 of donor roll 40 is made from a self-supporting cylinder of phenolic resin, preferably of the type manufactured by Tokai Rubber Industries of Japan, particularly of the "LGC" and "GCS'" formulations which are proprietary to that manufacturer. When this outer roll of phenolic is used, the core of donor roll 40 is intended to be of a conventional conductive material, such as aluminum. This phenolic resin is extruded in a self-supporting tube, doped to obtain a preselected conductivity, and, if necessary, ground down through techniques well-known in the art to assume the desired precise dimensions for a particular development apparatus. In one embodiment of the present invention, the intended wall thickness of the phenolic cylinder forming outer surface 42 is between 1 and 2 mm, on a donor roll 40 having a total outer diameter of approximately 25 mm; this thickness represents a compromise between concerns of mechanical stability and cost. It has been found that this phenolic resin is particularly suited for the design parameters of a donor roll in scavengeless development, either of the magnetic brush or single-component variety. Because the self-supporting tube of phenolic resin may be made with relatively thick walls, the thickness of the walls can be exploited to ensure that surface anomalies such as craters or pin holes are kept to a minimum. Phenolic resin has been shown to be a suitably hard substance which has presented no significant abrasion problems when placed within moving contact with a magnetic brush for an extended period. And, once again, because phenolic resin is relatively easily worked, it is possible to grind down such a cylinder to a small extent to ensure precise dimensions.

A key parameter for the outer surface of the donor roll according to the present invention is the discharge time constant thereof. The time constant for discharge is the amount of time that 63% of a given charge on the surface of the donor roll will be dissipated. As such a time time constant is, as is well-known in electrical engineering, a function of the resistance and capacitance of the device in question, it follows that two key parameters for the composition of the phenolic resin are its conductivity (which relates to resistance) and its dielectric constant (which relates to capacitance). Conductivity of the specific additives in the phenolic resin is a factor in its overall conductivity. Among conductive agents which may be used to obtain a desired conductivity are carbon black or graphite, or a partially conductive substance such as tin oxide or other metal oxide. The reported dielectric constant for the "GCS'" phenolic is 33. These parameters relate to the time constant by the relationship $$\tau_d = \epsilon_o K_d / \sigma_d$$

where $\tau_d$=donor roll time constant(in seconds)

$\epsilon_o$=free space permitivity constant $=0.885\times10^{-14}$ sec/(cm-ohm)

$K_d$=Phenolic coating dielectric constant (no units)

$\sigma_d$=Phenolic coating electrical conductivity (in 1/(cm-Ω)).

As can be seen by the foregoing, the physical attribute of the phenolic that can be most easily controlled to obtain a desired time constant is the conductivity of the phenolic, which can be influenced by the proper concentration and selection of additives. For the application of a donor roll of the present invention to hybrid scavengeless development with a magnetic brush transfer roll, it has been calculated that the most desired range for this time constant is from 1 to 300 microseconds, with a further preferred range of 30 to 70 microseconds.

It should be emphasized that this range of desired optimal discharge time constants is substantially different from previously preferred ranges in the scavengeless context, particularly those associated with anodized-aluminum donor rolls. In U.S. Pat. No. 5,063,875, assigned to the assignee of the present invention, for example, the surface conductivity of a preferred anodized-aluminum donor roll is $10^{-11}$ (ohm-cm)$^{-1}$. Considering that the $K_d$ of anodized aluminum is 9, the resulting $\tau_d$ is 80 microseconds, which is long compared with residence times in the donor-photoreceptor nip as well as the interface between the magnetic brush and the donor roll. With a phenolic donor roll having a discharge time constant in the preferred range according to the present invention, a suitable range of conductivities is between $10^{-8}$ and $10^{-6}$(ohm-cm)$^{-1}$.

Although the above-described embodiment permits numerous advantages for a practical development system, the preferred ranges of certain of the physical properties thereof are selected according to numerous, and occasionally conflicting, design parameters. These design constraints are particularly apparent in the hybrid case described above, wherein the donor roll is "loaded" with toner by the magnetic brush of the transport roll. Among these design constraints are: the surface charge relaxation (i.e., the discharge time constant) of the donor roll; magnetic brush development relaxation, which relates to the ability of the magnetic brush to transport a maximum amount of toner to the donor roll across the nip therebetween, and which is a function of the ability of electric fields between the transport roll and the donor roll to collapse quickly as the surface thereof moves away from the nip; AC frequency relaxation, which relates to the conductivity or insulative properties of the donor roll relative to the AC in the electrode wires and affects the field intensification near the wires; and the image development response of the photoreceptor, which generally states that, for uniform field strength between the donor roll and photoreceptor, the dielectric charges on the donor roll must be able to relax faster than the photoreceptor image voltages can change.

Taking all of these constraints and others into account, it has been found that certain of these constraints can be met by a proper selection of material for the outer surface 42 of donor roll 41, particularly as regards the thickness $s_d$ of the dielectric layer forming outer surface 42 and the actual dielectric constant $k_d$ thereof. One or more such constraints for practical applications of scavengeless development may be met simply by providing a ratio $s_d/K_d$ of dielectric thickness over dielectric constant within certain ranges. (As dielectric constant has no units, the units of the ratio are in length.) The use of this ratio to meet some of the above design constraints may be summarized as follows:

if $s_d/K_d$<<electrode wire diameter (≈50 μm) then the conductivity constraints for the AC frequency relaxation can be neglected.

<<air gap between donor roll and photoreceptor (≈300 μm) then the photoreceptor image development response constraints can be neglected.

<<toner particle diameter (≈10 μm) then the magnetic brush development relaxation requirement can be neglected.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An apparatus for developing an electrostatic latent image, comprising:

a housing defining a chamber for storing a supply of developer material therein;

a donor roll, having an outer surface [including phenolic resin], mounted at least partially in the chamber of said housing, said donor roll being adapted to advance developer material to the latent image, with the discharge time constant of the surface of the donor roll being less than 300 microseconds; and an electrode member positioned in the space between the latent image and the donor roll, the electrode member being closely spaced from the donor roll and being electrically biased to detach toner particles from the donor roll so as to form a toner powder cloud in the space between the electrode member and the latent image with detached toner particles from the toner cloud developing the latent image.

2. An apparatus as in claim 1, wherein the [phenolic resin] *outer layer* of the donor roll is doped to a conductivity greater than $10^{-8}$ (ohm-cm)$^{-1}$.

3. An apparatus as in claim 1, wherein the electrode member includes a plurality of small diameter wires.

4. An apparatus as in claim 1, further comprising:

a transport roll mounted in the chamber of the housing and being positioned adjacent the donor roll, the transport roll being adapted to advance developer material to the donor roll; and means for rotating the transport roll and the donor roll.

5. An apparatus as in claim 4, further comprising:

means for applying an alternating electric field between the donor roll and the transport roll to assist in transferring at least a portion of the developer material from the transport roll to the donor roll.

6. An apparatus as in claim 5, wherein the applying means applies an electrical field that alternates at a selected frequency ranging between about 200 Hz and about 20 kHz with a voltage less than 400 $V_{rms}$.

7. An apparatus for developing an electrostatic latent image, comprising:

a housing defining a chamber for storing a supply of developer material therein;

a donor roll mounted at least partially in the chamber of said housing, said donor roll being adapted to advance developer material to the latent image; and an electrode member positioned in the space between the latent image and the donor roll, the electrode member being closely spaced from the donor roll and being electrically biased to detach toner particles from the donor roll so as to form a toner powder cloud in the space between the donor roll and the latent image with detached toner particles from the toner cloud developing the latent image;

wherein the electrical discharge time constant of the surface of the donor roll is less than 300 microseconds.

8. An apparatus for developing an electrostatic latent image on a charge-retentive surface, comprising:

a housing defining a chamber for storing a supply of developer material therein; and a donor roll mounted at least partially in the chamber of said housing, said donor roll being adapted to advance developer material to the latent image, including a conductive inner portion and a substantially non-metallic outer layer, wherein the thickness of the outer layer divided by the dielectric constant thereof is less than the distance between the donor roll and the charge-retentive surface.

9. An apparatus as in claim 8, wherein the thickness of the outer layer divided by the dielectric constant thereof is less than the average diameter of particles in the developer material to be applied to the charge-retentive surface.

10. An apparatus as in claim 8, further comprising:

an electrode member including at least one wire positioned in the space between the latent image and the donor roll, the electrode member being closely spaced from the donor roll and being electrically biased to detach toner particles from the donor roll so as to form a toner powder cloud in the space between the donor roll and the charge-retentive surface with detached toner particles from the toner cloud developing the latent image; and wherein the thickness of the outer layer divided by the dielectric constant thereof is less than the diameter of the wire.

*11. An apparatus according to claim 1, wherein said outer surface of the donor roll includes phenolic resin.*

*12. A donor roll for use in a machine in which a voltage differential is applied between a core of the donor roll and*

*a charging region adjacent to an outer surface of the donor roll, the donor roll comprising:*

*a cylindrical core; and*

*a layer secured to said cylindrical core, wherein said layer is formed of a semiconductive material selected to control an RC circuit time constant relating to electrical response of the semiconductive layer to the applied voltage differential.*

*13. A donor roll according to claim 12, wherein the RC circuit time constant is less than 300 microseconds.*

*14. A donor roll according to claim 12, wherein said layer comprises a phenolic material.*

*15. A donor roll according to claim 12, wherein said layer has a thickness of 1 to 25 mils.*

*16. A donor roll according to claim 12, wherein said layer has a thickness of 1 to 2 mm.*

*17. A donor roll according to claim 12, wherein said core comprises a conductive material.*

*18. A donor roll according to claim 17, wherein said core comprises aluminum.*

*19. A donor roll according to claim 12, wherein a thickness of said layer divided by a dielectric constant thereof is less than a distance between the donor roll and the charging region.*

*20. A donor roll according to claim 12, wherein said layer has a thickness less than 1.65 mm.*

*21. A donor roll according to claim 20, wherein said layer has a thickness less than 0.33 mm.*

*22. An apparatus for developing an electrostatic latent image, comprising:*

*a housing defining a chamber for storing a supply of developer material therein; and*

*a donor roll having a cylindrical core and a layer secured to said cylindrical core and mounted at least partially in the chamber of said housing, wherein said layer is formed of a semiconductive material selected to control an RC circuit time constant relating to electrical response of the semiconductive layer to the applied voltage differential.*

*23. An apparatus according to claim 22, wherein the RC circuit time constant of said layer of said donor roll is less than 300 microseconds.*

*24. An apparatus according to claim 22, wherein said layer comprises a phenolic material.*

*25. An apparatus according to claim 22, wherein said layer has a thickness of 1 to 25 mils.*

*26. An apparatus according to claim 22, wherein said layer has a thickness of 1 to 2 mm.*

*27. An apparatus according to claim 22, wherein said core comprises a conductive material.*

*28. An apparatus according to claim 27, wherein said core comprises aluminum.*

*29. An apparatus according to claim 22, wherein a thickness of said layer divided by a dielectric constant thereof is less than a distance between the donor roll and the latent image.*

*30. An apparatus according to claim 22, further comprising an electrode member positioned in the space between the latent image and the donor roll, the electrode member being closely spaced from the donor roll and being electrically biased to detach toner particles from the donor roll so as to form a toner powder cloud in the space between the electrode member and the latent image with detached toner particles from the toner cloud developing the latent image.*

*31. An apparatus according to claim 22, wherein said layer has a thickness less than 1.65 mm.*

*32. An apparatus according to claim 31, wherein said layer has a thickness of less than 0.33 mm.*

*33. An electrophotographic printing machine of the type having a developer unit adapted to develop with toner an electrostatic latent image recorded on a photoconductive member, wherein the developer unit comprises:*

*a housing defining a chamber for storing a supply of developer material therein; and*

*a donor roll having a cylindrical core and a layer secured to said cylindrical core and mounted at least partially in the chamber of said housing, wherein said layer is formed of a semiconductive material selected to control an RC circuit time constant relating to electrical response to the semiconductive layer to the applied voltage differential.*

*34. A printing machine according to claim 33, wherein the RC circuit time constant of said layer of said donor roll is less than 300 microseconds.*

*35. A printing machine according to claim 33, wherein said layer comprises a phenolic material.*

*36. A printing machine according to claim 33, wherein said layer has a thickness of 1 to 25 mils.*

*37. A printing machine according to claim 33, wherein said layer has a thickness of 1 to 2 mm.*

*38. A printing machine according to claim 33, wherein said core comprises a conductive material.*

*39. A printing machine according to claim 38, wherein said core comprises aluminum.*

*40. A printing machine according to claim 33, wherein a thickness of said layer divided by a dielectric constant thereof is less than a distance between the donor roll and the latent image.*

*41. A printing machine according to claim 33, further comprising an electrode member positioned in a space between the latent image and the donor roll, the electrode member being closely spaced from the donor roll and being electrically biased to detach toner particles from the donor roll so as to form a toner powder cloud in the space between the electrode member and the latent image with detached toner particles from the toner cloud developing the latent image.*

*42. A printing machine according to claim 33, wherein said layer has a thickness less than 1.65 mm.*

*43. A printing machine according to claim 42, wherein said layer has a thickness less than 0.33 mm.*

*44. A donor roll of a scavengerless xerographic apparatus comprising:*

*a cylindrical core; and*

*a layer secured to said cylindrical core and formed of a semiconductive material;*

*wherein a discharge time constant of said layer is selected to discharge a predetermined portion of a charge on said layer within a predetermined time period.*

* * * * *